(12) United States Patent
Todorovic et al.

(10) Patent No.: US 11,448,162 B2
(45) Date of Patent: Sep. 20, 2022

(54) PROPELLING NOZZLE FOR A TURBOFAN ENGINE ON A SUPERSONIC AIRCRAFT

(71) Applicant: Rolls-Royce Deutschland Ltd & Co KG, Blankenfelde-Mahlow (DE)

(72) Inventors: Predrag Todorovic, Berlin (DE); Thomas Schillinger, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 156 days.

(21) Appl. No.: 16/954,053

(22) PCT Filed: Dec. 5, 2018

(86) PCT No.: PCT/EP2018/083676
§ 371 (c)(1),
(2) Date: Jun. 15, 2020

(87) PCT Pub. No.: WO2019/121022
PCT Pub. Date: Jun. 27, 2019

(65) Prior Publication Data
US 2021/0079870 A1     Mar. 18, 2021

(30) Foreign Application Priority Data
Dec. 19, 2017   (DE) .................... 10 2017 130 563.7

(51) Int. Cl.
F02K 1/08       (2006.01)
F02K 1/56       (2006.01)
(Continued)

(52) U.S. Cl.
CPC ................ F02K 1/56 (2013.01); B64D 27/16 (2013.01); F02K 1/08 (2013.01); F02K 1/70 (2013.01);
(Continued)

(58) Field of Classification Search
CPC ... F02K 1/06; F02K 1/08; F02K 1/085; F02K 1/60; F02K 1/70; F02K 1/605; F02K 1/62; F02K 1/625
See application file for complete search history.

(56) References Cited

U.S. PATENT DOCUMENTS 2,516,819 A * 7/1950 Whittle ..................... F02K 1/04
                                                         138/37
2,648,353 A * 8/1953 Haworth ................... F02K 1/04
                                                         138/37
(Continued)

FOREIGN PATENT DOCUMENTS

| DE | 4012212 A | 10/1991 |
|---|---|---|
| DE | 4114319 A | 11/1991 |
| GB | 1114478 A | 5/1968 |

OTHER PUBLICATIONS

International Search Report dated Feb. 20, 2019 from counterpart PCT App No. PCT/EP2018/083676.
(Continued)

*Primary Examiner* — Todd E Manahan
*Assistant Examiner* — Marc J Amar
(74) *Attorney, Agent, or Firm* — Shuttleworth & Ingersoll, PLC; Timothy Klima

(57) ABSTRACT

The invention relates to a propelling nozzle for a turbofan engine on a supersonic aircraft, the propelling nozzle including: a propelling nozzle wall, a duct, which is radially outwardly bounded by the propelling nozzle wall, and a central body arranged in the duct. According to the invention, the central body is connected to the propelling nozzle wall via at least one brace.

20 Claims, 8 Drawing Sheets

(51) Int. Cl.
  *B64D 27/16* (2006.01)
  *F02K 1/78* (2006.01)
  *F02K 5/00* (2006.01)
  *F02K 1/70* (2006.01)
  *B64C 30/00* (2006.01)

(52) U.S. Cl.
  CPC .................. *F02K 1/78* (2013.01); *F02K 5/00* (2013.01); *B64C 30/00* (2013.01); *F05D 2220/80* (2013.01)

(56) References Cited

U.S. PATENT DOCUMENTS

| | | | | |
|---|---|---|---|---|
| 3,568,930 A | * | 3/1971 | Kuchar | F02K 1/62 239/265.19 |
| 3,612,402 A | * | 10/1971 | Timms | B64C 9/38 239/265.29 |
| 3,908,683 A | * | 9/1975 | Demetrick | F02C 7/045 137/15.1 |
| 4,527,388 A | | 7/1985 | Wallace, Jr. | |
| 5,082,181 A | * | 1/1992 | Brees | F02K 1/006 239/265.19 |
| 5,826,823 A | * | 10/1998 | Lymons | B64D 33/04 244/110 B |
| 5,908,159 A | * | 6/1999 | Rudolph | F02K 1/383 239/265.17 |
| 5,941,065 A | | 8/1999 | Lidstone et al. | |
| 2007/0125065 A1 | * | 6/2007 | Renggli | F02K 3/04 60/204 |
| 2008/0141655 A1 | * | 6/2008 | Johnson | F02K 3/11 60/226.3 |
| 2017/0191447 A1 | | 7/2017 | Osman | |

OTHER PUBLICATIONS

German Search Report dated Jul. 26, 2018 from counterpart German Patent Application No. 102017130563.7.

* cited by examiner

PROPELLING NOZZLE FOR A TURBOFAN ENGINE ON A SUPERSONIC AIRCRAFT

This application is the National Phase of International Application PCT/EP2018/083676 filed Dec. 5, 2018 which designated the U.S.

This application claims priority to German Patent Application No. DE102017130563.7 filed Dec. 19, 2017, which application is incorporated by reference herein.

The invention relates to a thrust nozzle for a turbofan engine of a supersonic aircraft according to the present disclosure.

It is known from military applications to form a convergent-divergent thrust nozzle of a turbofan engine with an adjustable geometry. For this purpose, it is for example known to form a thrust nozzle as an iris/petal nozzle with a large number of individual adjustable lamellae. The complexity of such thrust nozzles is high because the individual lamellae have to be provided with actuators for the adjustability thereof. Further disadvantages are an increased weight of the thrust nozzle owing to the actuators, a high level of noise generation, and an intensive maintenance requirement.

It is known from the Messerschmidt 262 fighter aircraft to arrange a central body in a thrust nozzle, which central body is axially adjustable for the purposes of setting the nozzle exit area by means of a nozzle needle arranged on the machine axis.

The present invention is based on the object of providing a thrust nozzle, which is suitable for supersonic operation, of a turbofan engine, which thrust nozzle is designed in an advantageous manner in terms of construction.

This object is achieved by means of a thrust nozzle having the features as disclosed herein. Embodiments of the invention are also set forth in the present disclosure.

Accordingly, the present invention concerns a thrust nozzle, which thrust nozzle has a thrust nozzle wall, a flow channel which is delimited radially to the outside by the thrust nozzle wall, and a central body arranged in the flow channel. Provision is made whereby the central body is connected via at least one strut to the thrust nozzle wall.

The present invention is based on the concept of connecting the central body arranged in the flow channel to the thrust nozzle wall exclusively via one or more radially extending struts, and of thereby achieving that loads acting on the central body are introduced directly into the thrust nozzle wall. Forces and torques that arise are dissipated into the thrust nozzle wall along the shortest path. By contrast, a mounting of the central body at rear regions of the core engine, and an associated introduction of loads acting on the central body into the core engine and/or rotor bearing structures of the engine, are avoided.

In one embodiment of the invention, the struts have a streamlined profile with a leading edge and a trailing edge. The profile is aerodynamically optimized in order to minimize the air resistance generated by the struts. Here, in one design variant, the profile is of symmetrical design and is not designed to generate lift.

The central body may basically be connected to the thrust nozzle wall via one or more struts, for example via two, three, four or five struts, which are arranged equidistantly with respect to one another in a circumferential direction. One embodiment of the invention provides for the central body to be connected via exactly two struts to the thrust nozzle wall, wherein the two struts are arranged approximately in a plane, that is to say are spaced apart in the circumferential direction by approximately 180°, wherein slightly angled arrangements of the two struts with respect to one another are also possible, for example with a spacing of the top sides in the circumferential direction in the range between 160° and 200°. A lightweight mounting of the central body on the thrust nozzle wall, which has only a minimal influence on the flow in the flow channel, is made possible through the use of two struts.

A further embodiment of the invention provides for the thrust nozzle to have an upstream coupling region which is designed and provided for being connected to housing components of the core engine. The upstream coupling region is for example a ring-shaped upstream flange of the thrust nozzle. The housing components of the core engine to which the upstream coupling region is connected are for example components of the turbine housing. The at least one strut, the thrust nozzle wall and the upstream coupling region are in this case arranged such that forces acting on the central body are conducted via the at least one strut and the thrust nozzle wall into the upstream coupling region. In this way, it is made possible for the loads acting on the central body to be dissipated directly via the thrust nozzle wall into said coupling region and from the latter to load-bearing structures of the engine.

Alternatively, provision may be made whereby the forces acting on the central body are dissipated via the at least one strut and the thrust nozzle wall directly into the pylon, for which purpose the thrust nozzle wall is for example connected directly to the pylon by means of defined fastening points.

It is pointed out that the thrust nozzle wall refers generally to the wall of the thrust nozzle. The thrust nozzle wall may be of multi-layer construction, and may in particular comprise an inner wall and an outer wall. Here, the inner wall faces toward the gas flow and delimits the flow path through the thrust nozzle. The outer wall adjoins the surroundings. Provision may furthermore be made whereby the thrust nozzle wall comprises both spatially fixed regions and movable regions, for example components of a thrust reverser. The thrust nozzle wall may also be referred to as the peripheral housing of the thrust nozzle.

One embodiment of the invention provides for the thrust nozzle wall to have structurally reinforced side structures, wherein the struts are connected to the reinforced side structure. It is ensured in this way that the struts are fastened to structures of the thrust nozzle wall which are suitable for absorbing and transmitting loads that arise. Here, in the context of the present invention, a side structure may also be formed in an upper region or in a lower region of the thrust nozzle.

One embodiment in this regard provides for a thrust reverser to be integrated into the thrust nozzle, which thrust reverser comprises two pivotable thrust reverser doors. The thrust reverser doors are rotatably mounted in two reinforced side structures which are formed on opposite sides of the thrust nozzle wall. Here, said thrust reverser doors form pivotable parts of the thrust nozzle wall. Owing to the mounting of the thrust reverser doors, the side structures are structurally reinforced and are thus highly suitable for a connection to the struts. This embodiment of the invention is thus associated with the advantage that the forces acting on the central body are conducted via the struts along the shortest load path, without diversions, into a side structure of the thrust nozzle, which side structure has a high load-bearing capacity in any case owing to the mounting of the axles of the thrust reverser doors.

Here, the thrust reverser integrated into the thrust nozzle is designed as an internal thrust reverser, wherein, during a thrust reversal, the flow is conducted laterally, that is to say upward and downward, out of the thrust nozzle. After the thrust reverser doors have been pivoted out, the gas flow in the thrust nozzle is thus diverted outward. In the case of the thrust nozzle wall being formed with an inner wall and an outer wall, the thrust reverser doors are formed by regions of the inner wall and of the outer wall.

One embodiment of the invention provides that the thrust reverser doors are, in the pivoted position, positioned such that their radially inner ends are arranged at least partially downstream of the leading edges of the struts and at the same time lie against the struts. Accordingly, the struts participate, in conjunction with the pivoted-open thrust reverser doors, in the blocking of the thrust nozzle. This has the effect that the thrust reverser doors can be designed to be shorter without reducing the aerodynamic performance of the thrust reversal system. This also leads to a weight saving.

In one embodiment of the invention, provision is made whereby at least the leading edges of the struts are positioned axially upstream of the nozzle throat of the thrust nozzle. Further embodiments provide for the struts in their entirety to be positioned upstream of the nozzle throat of the thrust nozzle.

The thrust nozzle according to the invention basically does not need an adjustable geometry, that is to say the nozzle throat area and the nozzle exit area are, in exemplary embodiments of the invention, not variable in terms of their geometry. Here, the nozzle throat area (commonly referred to as A8) refers to the narrowest cross-sectional area of the flow channel, and the nozzle exit area (commonly referred to as A9) refers to the cross-sectional area of the flow channel at the rear end of the thrust nozzle. The central body is accordingly fixed in an axial direction. Owing to the omission of adjustable geometries, such a thrust nozzle has relatively few individual parts, has a relatively low weight, and is easy to maintain.

However, even in the case of a thrust nozzle without adjustable geometry, a certain adaptation of the effective nozzle exit area occurs automatically in a manner dependent on the respective state of the surrounding flow and the nozzle exit Mach number, which jointly influence the jet cross section effectively exposed to throughflow downstream of the nozzle exit area (commonly referred to as A9').

Alternative embodiments of the invention provide for the central body to be axially displaceable relative to the thrust nozzle wall. By means of axial displaceability of the central body, a thrust nozzle is provided which has a flow channel which forms a variable nozzle throat area and a variable nozzle exit area, wherein the present values of the nozzle throat area and of the nozzle exit area are dependent on the axial position of the central body. The settability of nozzle throat area and nozzle exit area makes it possible to provide the degree of expansion of the flow channel downstream of the nozzle throat area, that is to say the ratio of the effective A9'/A8 (which is always greater than or equal to one), in a desired manner for every operating state.

To realize axial displaceability of the central body relative to the thrust nozzle wall, one embodiment of the invention provides for the central body to be axially displaceable relative to the struts. For this purpose, for example, a rail guide and actuators are provided, by means of which the central body is displaceable in the axial direction relative to the radially inner ends of the struts. An alternative embodiment provides, for the axial displaceability of the central body, that the struts are axially displaceable relative to the thrust nozzle wall. Here, displaceability of the central body relative to the struts is not necessary. To realize displaceability of the struts relative to the thrust nozzle wall, it is in turn the case, for example, that a rail guide and actuators are provided, by means of which the radially outer ends of the struts are displaceable in an axial direction relative to the thrust nozzle wall. For example, hydraulic pistons or electric motors serve as actuators. Use may self-evidently also be made of other devices which permit displaceability of the central body relative to the struts or of the struts relative to the thrust nozzle wall. Such devices may for example comprise sliding surfaces, trapezoidal threads and/or threaded spindles.

In the case of both of the embodiments mentioned above, provision may be made whereby the actuators which effect axial displaceability of the central body are arranged in the thrust nozzle wall (for example on that side of an inner nozzle wall which is averted from the flow channel) and thus in the "cold structure" (outside the hot gases of the flow channel). Here, provision may be made whereby the adjusting force, or the torque which is transmitted for an adjustment, is transmitted by means of a linkage connected by means of joints, or the like, to the interface between central body and struts or to the interface between struts and thrust nozzle wall, where the transmitted force or the transmitted torque is converted into a translational movement. If the central body is displaceable relative to the struts, provision is made whereby such a linkage is led to the interface between the central body and the struts through cavities which are formed in the struts.

One embodiment of the invention provides for the upstream end of the central body to be arranged downstream of the leading edge of the struts, wherein the struts adjoin one another in their upstream region at their radially inner ends and form a common leading edge. Thus, in this embodiment, the struts form, at the leading edge and adjoining this, a common areal structure out of which the central body then grows, as it were, in three-dimensional fashion at an axial distance from the leading edge.

Here, provision may be made whereby the leading edges of the struts collectively form an arcuate curve which extends furthest upstream at its radially outer ends adjoining the thrust nozzle wall and extends furthest downstream at the centerline of the thrust nozzle. The arcuate curve may for example run in semicircular or approximately semicircular fashion, or may be of some other curving form.

An alternative embodiment of the invention provides for the upstream end of the central body to be arranged at the leading edge of the struts or upstream of the leading edge of the struts. In this embodiment, the upstream end of the central body is thus arranged upstream or at the leading edge of the struts, or protrudes forward. In this design variant, too, it may be provided that the thrust reverser doors are, in the pivoted position, positioned such that their radially inner ends are arranged at least partially downstream of the leading edges of the struts and at the same time lie against the struts. For this purpose, provision may be made whereby the thrust reverser doors have a corresponding trailing edge cutout in the region which adjoins the central body in the pivoted position.

The central body and the struts which connect the central body to the thrust nozzle wall may be composed of individual interconnected components, or may alternatively be formed as a single piece.

In general, the struts may be of solid or lightweight construction, in particular may be substantially hollow or formed with defined cavities.

The central body may basically be shaped in a variety of ways. Embodiments provide for the central body to have an upstream end and a downstream end and to form at least one maximum of its cross-sectional area between these. From the upstream end, the cross-sectional area increases in an axial direction proceeding from zero, or from a starting value greater than zero, up to the at least one maximum. Toward the downstream end, the cross-sectional area decreases to zero, or to a final value greater than zero. Here, provision may be made whereby the central body is of conical shape at the upstream end and/or at the downstream end. The central body is preferably arranged in the flow channel exclusively via the struts which extend from the central body in a radial direction to the thrust nozzle wall and in so doing project through the flow channel.

In one embodiment of the invention, the thrust nozzle is designed as a three-dimensional thrust nozzle with a rotationally symmetrical central body which forms rotational symmetry when rotated about its longitudinal axis, wherein the longitudinal axis of the central body at least approximately coincides with the machine axis of the engine in which the thrust nozzle is formed. Provision may furthermore be made whereby the thrust nozzle wall has a circular cross section, wherein this is not necessarily the case.

Alternatively, the thrust nozzle may be designed as a two-dimensional thrust nozzle. In the case of a two-dimensional thrust nozzle, the inner wall thereof is of substantially rectangular form in cross section. In this case, the central body may likewise be of substantially rectangular form in cross section. Here, the struts connect, for example, two opposite side walls of the central body to the thrust nozzle wall.

A further embodiment of the invention provides for the thrust nozzle to be designed as a convergent thrust nozzle, as a convergent-divergent thrust nozzle, or as a convergent-cylindrical thrust nozzle. Accordingly, in the two latter cases, the thrust nozzle wall is designed so as to have a narrowest cross section and an exit cross section which is larger than or identical to said narrowest cross section. The design of the thrust nozzle as a convergent-divergent thrust nozzle or as a convergent-cylindrical thrust nozzle is however not imperative. For example, the thrust nozzle may alternatively be designed as a thrust nozzle in the case of which the nozzle throat area and the nozzle exit area of the thrust nozzle wall coincide.

The thrust nozzle according to the invention is, in one exemplary embodiment, an integral thrust nozzle, wherein the primary flow through the core engine and the secondary flow through the bypass channel are mixed before being conducted into the integral thrust nozzle. Alternatively, the thrust nozzle according to the invention may be a separate thrust nozzle for the primary flow channel.

It is pointed out that the present invention is described with reference to a cylindrical coordinate system which has the coordinates x, r, and φ. Here, x indicates the axial direction, r indicates the radial direction, and φ indicates the angle in the circumferential direction. The axial direction is in this case identical to the machine axis of the turbofan engine and is also identical to the longitudinal axis of the central body. Proceeding from the x-axis, the radial direction points radially outward. Terms such as "in front of", "behind", "front", and "rear" always relate to the axial direction, or the flow direction in the engine. The expression "in front of" thus means "upstream of", and the expression "behind" means "downstream of". Terms such as "outer" or "inner" always relate to the radial direction.

The invention furthermore relates to a turbofan engine for a civilian or military supersonic aircraft, having a thrust nozzle according to the invention. The turbofan engine may have a thrust reverser.

The invention will be explained in more detail below on the basis of a plurality of exemplary embodiments with reference to the figures of the drawing. In the drawing.

Figure 9:
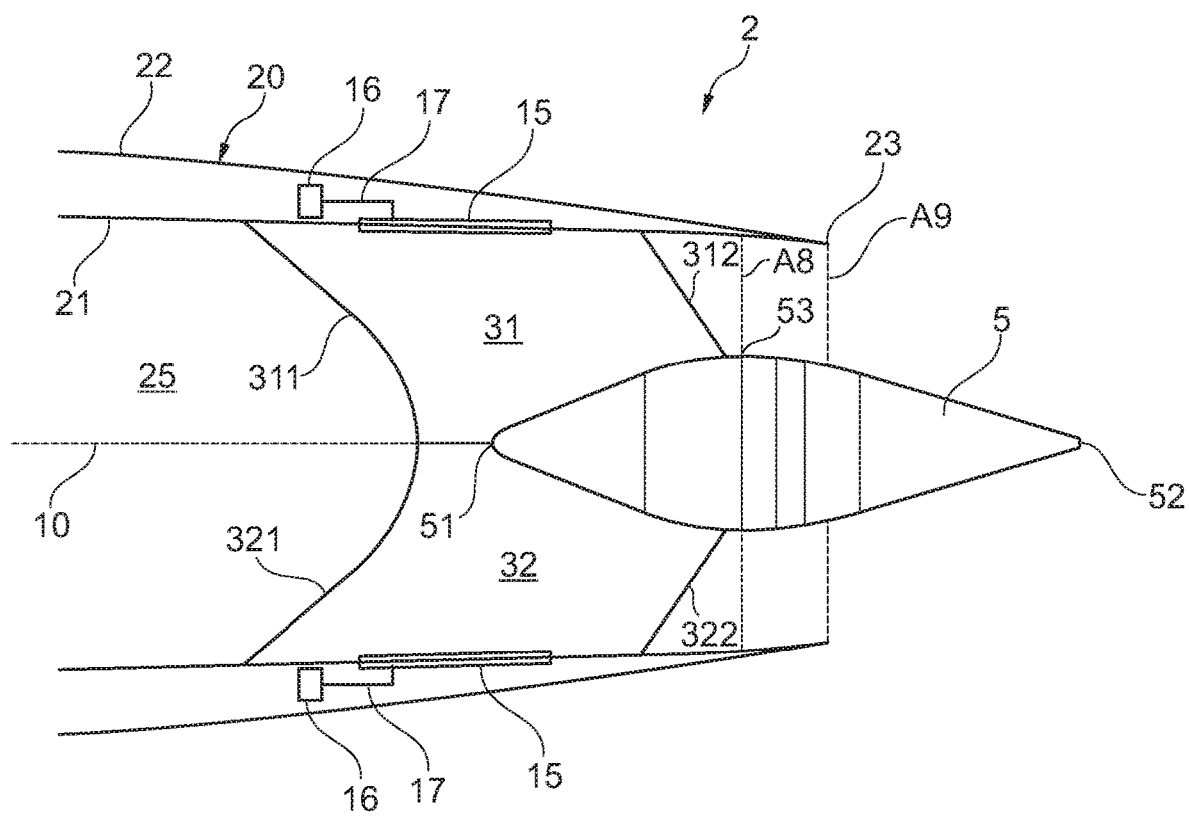
Figure 10:
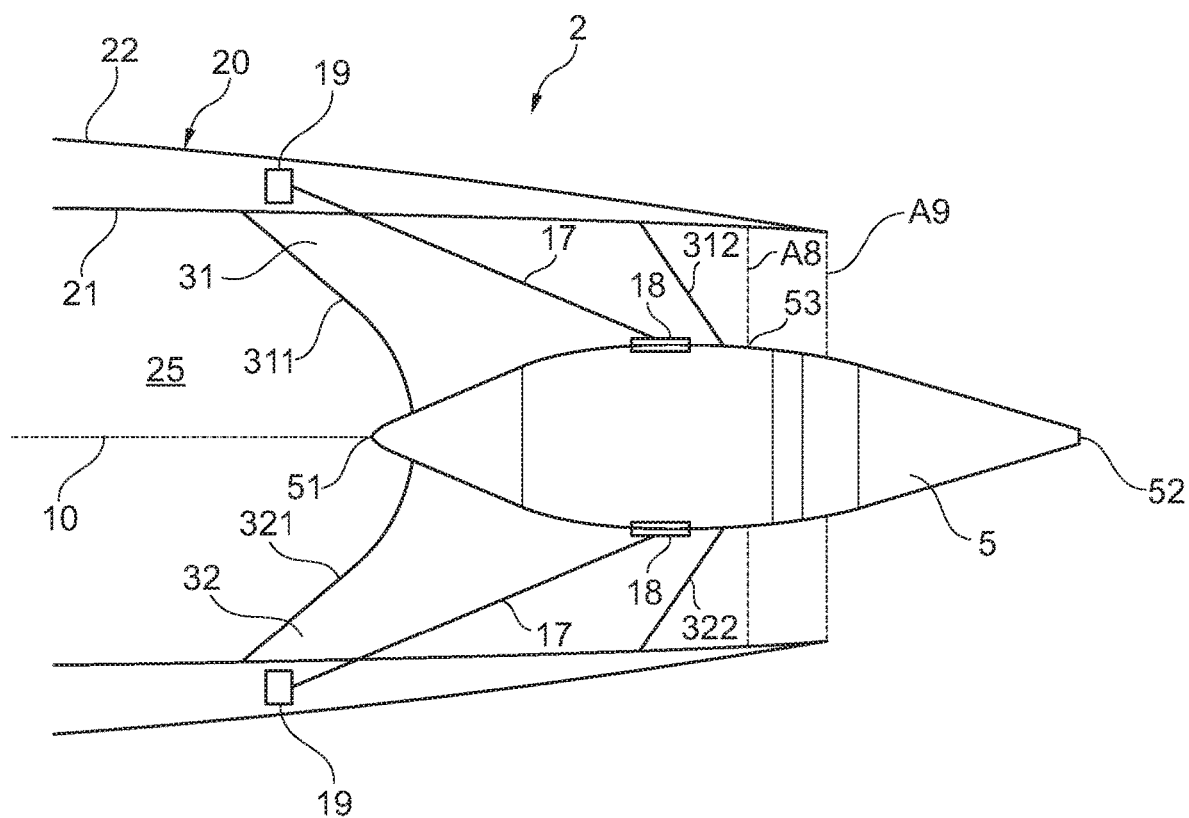

FIG. 9 shows, in a sectional view, a second exemplary embodiment of a thrust nozzle with a central body which is connected via two struts to the thrust nozzle wall of the thrust nozzle, wherein the struts are axially displaceable relative to the thrust nozzle wall; and FIG. 10 shows, in a sectional view, a third exemplary embodiment of a thrust nozzle with a central body which is connected via two struts to the thrust nozzle wall of the thrust nozzle, wherein the central body is axially displaceable relative to the struts.

Figure 1:
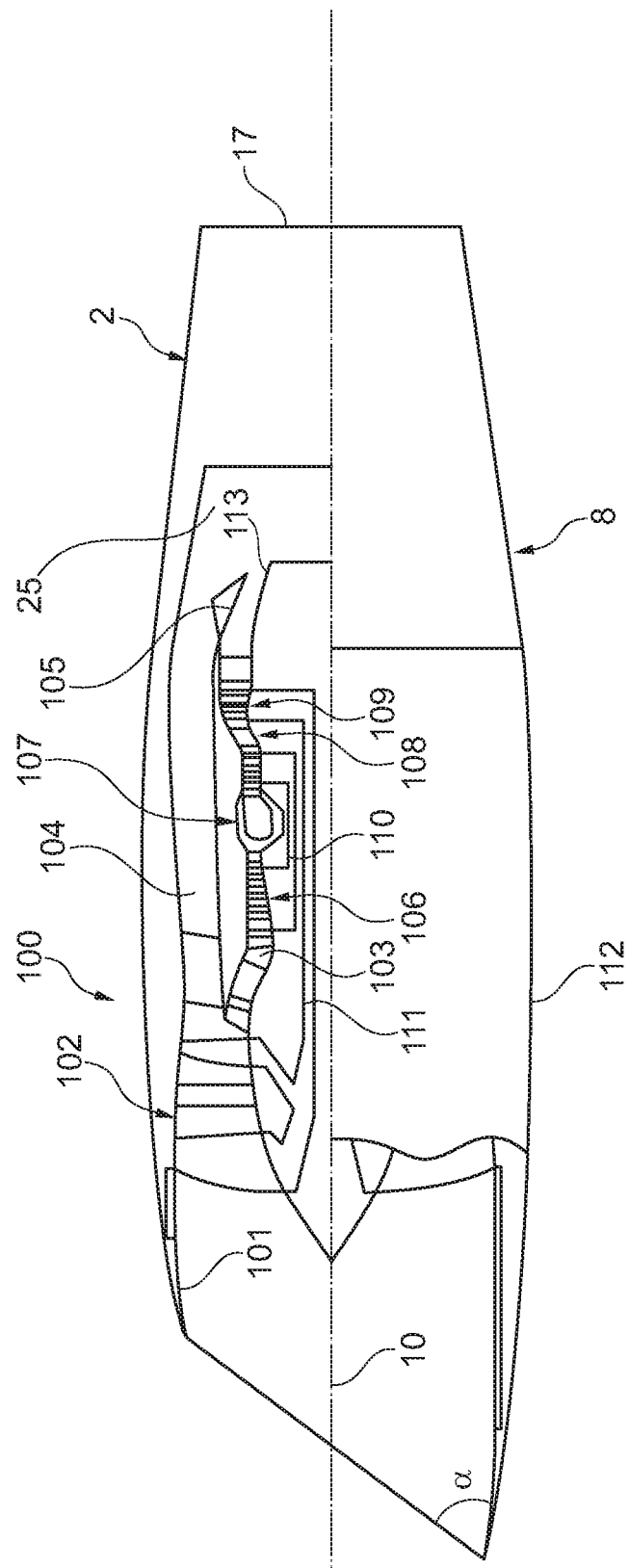
FIG. 1 is a simplified schematic sectional illustration of a turbofan engine in which the present invention can be realized, wherein the turbofan engine is suitable for use in a civilian or military supersonic aircraft.

FIG. 1 shows a turbofan engine which is provided and suitable for being used in a civilian or military supersonic aircraft and which is accordingly designed for operating states in the subsonic range, in the transonic range and in the supersonic range.

The turbofan engine 100 comprises an engine intake 101, a fan 102, which may be of multi-stage design, a primary flow channel 103, which leads through a core engine, a secondary flow channel 104, which leads past the core engine, a mixer 105 and a convergent-divergent thrust nozzle 2, into which a thrust reverser 8 may be integrated.

The turbofan engine 100 has a machine axis or engine centerline 10. The machine axis 10 defines an axial direction of the turbofan engine. A radial direction of the turbofan engine runs perpendicular to the axial direction.

The core engine has, in a manner known per se, a compressor 106, a combustion chamber 107 and a turbine 108, 109. In the exemplary embodiment illustrated, the compressor comprises a high-pressure compressor 106. A low-pressure compressor is formed by those regions of the multi-stage fan 102 which are close to the hub. The turbine, which is arranged downstream of the combustion chamber 107, comprises a high-pressure turbine 108 and a low-pressure turbine 109. The high-pressure turbine 108 drives a high-pressure shaft 110 which connects the high-pressure turbine 108 to the high-pressure compressor 106. The low-pressure turbine 109 drives a low-pressure shaft 111, which connects the low-pressure turbine 109 to the multi-stage fan 102. In an alternative embodiment, the turbofan engine may additionally have a medium-pressure compressor, a medium-pressure turbine and a medium-pressure shaft. Furthermore, in an alternative embodiment, provision may be made whereby the fan 102 is coupled via a speed-reducing transmission, for example a planetary transmission, to the low-pressure shaft 111.

The turbofan engine is arranged in an engine nacelle 112. This is for example connected via a pylon to the aircraft fuselage.

The engine intake 101 forms a supersonic air intake and is accordingly provided and suitable for decelerating the inflowing air to speeds below Ma 1.0 (Ma=Mach number). The engine intake is, in FIG. 1, but not imperatively, sloped so as to form an angle α, wherein the lower edge protrudes relative to the upper edge. This serves for better distributing compression shocks, which arise during supersonic flight, in an upward direction. It is however basically also possible for the engine intake to be of straight form, that is to say formed with an angle α of 90°, or formed with some other angle.

The flow channel through the fan 102 is divided, downstream of the fan 102, into the primary flow channel 103 and the secondary flow channel 104. The secondary flow channel 104 is also referred to as secondary flow channel or bypass channel.

Downstream of the core engine, the primary flow in the primary flow channel 103 and the secondary flow in the secondary flow channel 104 are mixed by the mixer 105. Furthermore, downstream of the turbine, there is attached an exit cone 113 for realizing desired cross sections of the flow channel.

The rear region of the turbofan engine is formed by an integral thrust nozzle 2, wherein the primary flow and the secondary flow are mixed in the mixer 105 before being conducted into the integral thrust nozzle 2. Here, downstream of the mixer 105, the engine forms a flow channel 25 which extends through the thrust nozzle 2. Alternatively, separate thrust nozzles may be provided for the primary flow channel 103 and the secondary flow channel 104.

In the context of the present invention, it is the configuration of the thrust nozzle 2, illustrated merely schematically in FIG. 1, which is of importance.

Figure 2:
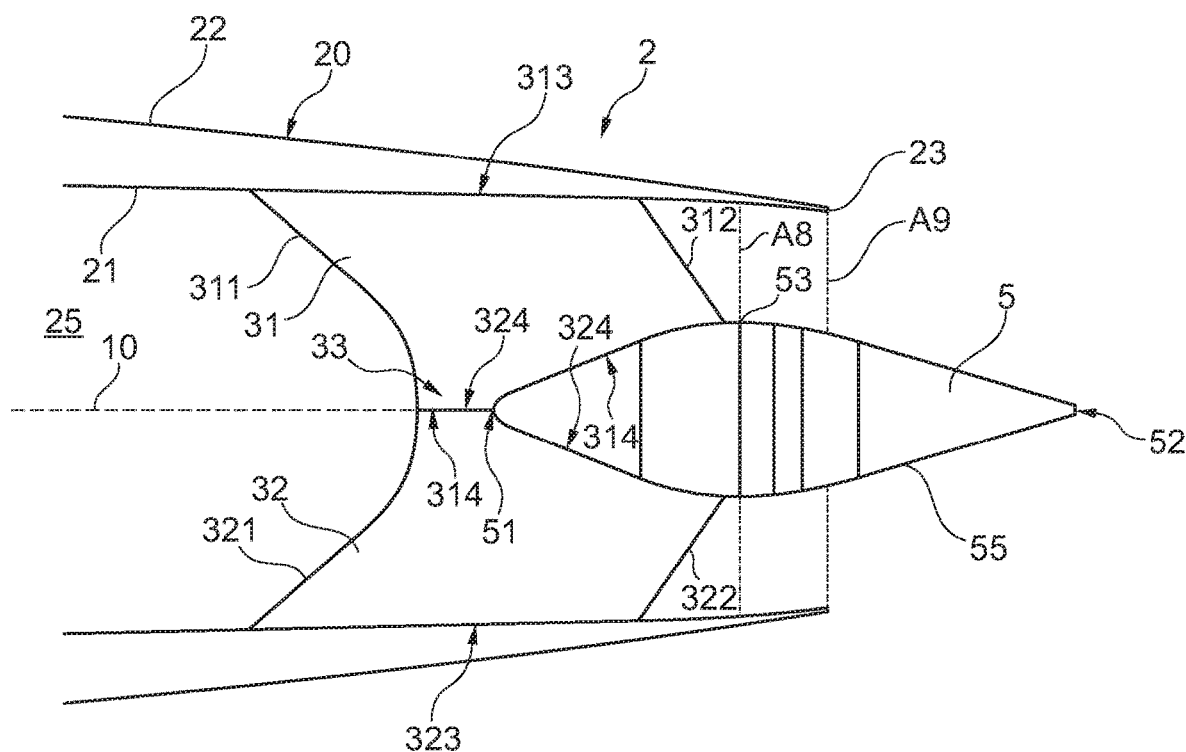
FIG. 2 shows, in a sectional view, a first exemplary embodiment of a thrust nozzle with a central body which is connected via two struts to the thrust nozzle wall of the thrust nozzle.

FIG. 2 shows an exemplary embodiment of a convergent-divergent thrust nozzle 2 in a longitudinal section encompassing the machine axis 10. The thrust nozzle 2 comprises a thrust nozzle wall 20 which is formed by an inner wall 21 and an outer wall 22. Here, the inner wall 21 forms, at the inner side, the radially outer boundary of the flow channel 25 in the thrust nozzle 2. The outer wall 22 is formed radially at the outside in relation to the inner wall 21 and adjoins the surroundings. The inner wall 21 and the outer wall 22 taper to a point in a downstream direction and, at their downstream end, form a nozzle exit edge 23.

The thrust nozzle 2 furthermore comprises a central body 5 which is formed as a body of revolution and which forms a surface 55. The central body 5 has a longitudinal axis which is identical to the machine axis 10. The central body 5 forms an upstream end 51, a downstream end 52 and, between the upstream end 51 and the downstream end 52, a maximum 53 of its cross-sectional area. Here, it is provided in the illustrated exemplary embodiment, but not imperatively, that the central body 5 is of conical form adjacent to its upstream end 51 and in the direction of its downstream end 52.

The upstream end 51 of the central body 5 may be formed by a point (as illustrated) or by a surface. Likewise, the downstream end 52 may be formed by a point or a surface (as illustrated).

The thrust nozzle 2 forms a nozzle throat area A8, at which the cross-sectional area between the central body 5 and the inner wall 21 is at a minimum. Typically, the axial position of the nozzle throat area A8 is defined by the axial position of the maximum 53 of the central body 5. However, this is not necessarily the case. At the nozzle exit edge 23, the thrust nozzle forms a nozzle exit area A9. This is equal to the difference between the cross-sectional area that the inner wall 21 forms at the nozzle exit edge 23 and the cross-sectional area of the central body 5 in the plane in question. The ratio A9 to A8 defines the degree of expansion of the flow channel 25 downstream of the nozzle throat area A8.

The thrust nozzle 2 furthermore comprises two struts 31, 32 which connect the central body 5 to the thrust nozzle wall 20, specifically the inner wall 21, and which for this purpose extend from the central body 5 in the radial direction through the flow channel 25 to the thrust nozzle wall 20. The struts 31, 32 each have a streamlined, symmetrical profile with a leading edge 311, 321 and a trailing edge 312, 322, and with an upper side and a lower side (which cannot be illustrated in the sectional illustration of FIG. 2). Each strut 31, 32 furthermore has a radially outer end 313, 323, at which it is connected to the inner wall 21, and a radially inner end 314, 324, at which it is connected to the central body 5. Here, the radially outer end 313, 323 forms an interface to the inner wall 21, and the radially inner end 314, 324 forms an interface to the central body 5.

Here, it is the case in the exemplary embodiment illustrated, but not imperatively, that the struts 31, 32 directly adjoin one another at their radially inner ends 314, 324 at their leading edges 311, 321 and in an upstream region 33 adjoining the leading edges 311, 321. Accordingly, they form a common, continuous leading edge which is not interrupted by the central body 5. Here, in the exemplary embodiment illustrated, the common leading edge 311, 321 forms an arcuate curve which extends furthest upstream at its radially outer ends adjoining the thrust nozzle wall 21 and extends furthest downstream at the centerline 10 of the thrust nozzle 2, wherein said common leading edge intersects the centerline 10 perpendicularly.

In other exemplary embodiments, the central body 5 adjoins the leading edges 31, 32, or protrudes axially in relation thereto, as will be discussed on the basis of FIG. 10.

Owing to the formation of a region 33 in which the radially inner ends 314, 324 of the struts 31, 32 adjoin one another, the upstream end 51 of the central body 5 is situated downstream of the leading edge 311, 321 of the struts 31, 32. It is however pointed out that the upstream end 51 of the central body 5 is situated upstream of the nozzle throat area A8. The downstream end 52 of the central body 5 is situated downstream of the nozzle throat area A8 and also downstream of the nozzle exit area A9. The axial position at which the central body 5 forms the maximum 53 of its cross-sectional area lies downstream of the trailing edges 312, 323 of the struts 31, 32, wherein this is not imperatively the case.

The struts 31, 32 are arranged approximately in a plane which encompasses the machine axis 10. Here, an arrangement of the struts "approximately" in a plane is present insofar as the struts have a three-dimensional extent corresponding to the profile that they form. Furthermore, provision may basically also be made whereby the two struts 31, 32 are arranged at an angle with respect to one another.

In the exemplary embodiment of FIG. 2, the central body 5 is fixed relative to the struts 31, 32, and the struts 31, 32 are fixed relative to the inner wall 21, such that the central body 5 is not axially displaceable in the flow channel 25. By contrast, in other exemplary embodiments, such displaceability is realized, as will be discussed on the basis of FIGS. 9 and 10.

Figure 3:
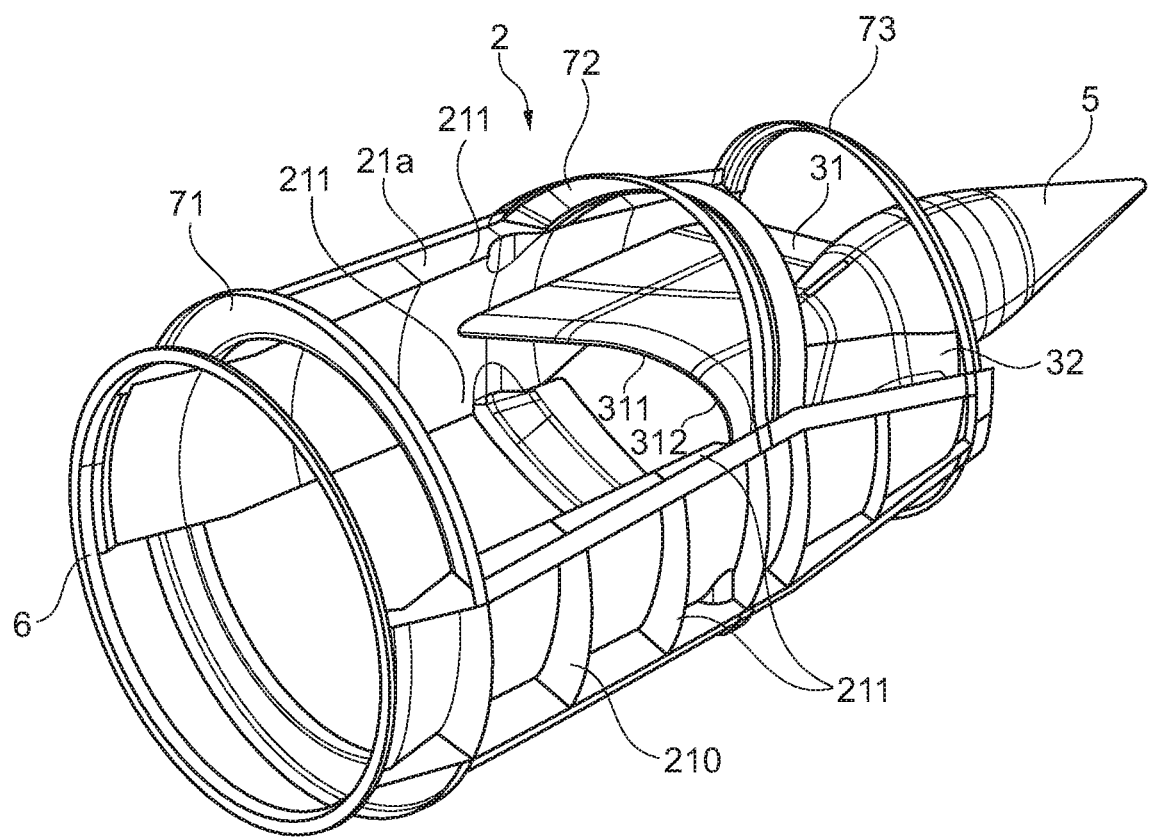
FIG. 3 shows the thrust nozzle of FIG. 2 in a perspective view obliquely from the front, wherein the outer wall of the thrust nozzle is not illustrated.
Figure 4:
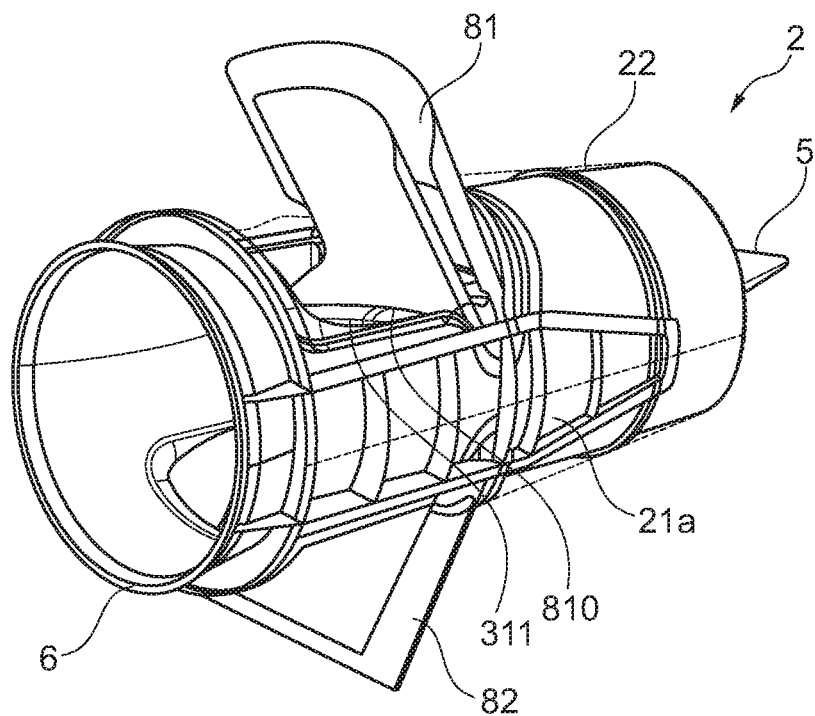
FIG. 4 shows the thrust nozzle of FIG. 3 in a lateral perspective view with opened thrust reverser doors.
Figure 5:
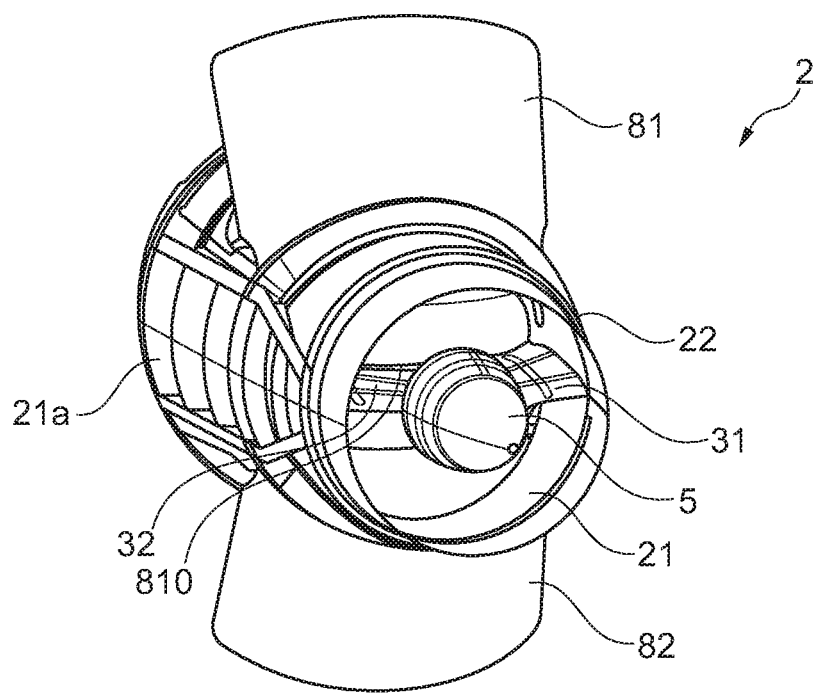
FIG. 5 shows the thrust nozzle of FIG. 4 in a perspective view approximately from the rear with opened thrust reverser doors.

FIG. 3 shows a perspective illustration of a thrust nozzle 2 designed correspondingly to FIG. 2. Here, the outer wall 22 of FIG. 2 is not illustrated, and the inner wall, which delimits the flow channel radially to the outside, is only partially illustrated. The inner wall comprises structurally reinforced side structures 21a, which are reinforced for example by means of struts 210. The reinforced side structures 21a comprise bearing points 211 (not illustrated in any more detail) for thrust reverser doors, which are illustrated in FIGS. 4 and 5. The side structures 21 are connected to one another at the top and at the bottom by means of semicircular structural elements 71, 72, 73. Here, the structural elements 71, 72, 73 also form a structure for the fastening of the outer wall 22 illustrated in FIG. 2.

As described with regard to FIG. 2, the thrust nozzle 2 comprises a central body 5 which is fixedly connected to the inner wall 21 by means of two streamlined struts 31, 32.

The thrust nozzle 2 furthermore has an upstream coupling region for a connection of the thrust nozzle 2 to housing components of the core engine, for example for the connection to a turbine housing. Said coupling region thus forms an interface for the fastening of the thrust nozzle 2, and in the exemplary embodiment illustrated is formed by a ring-shaped flange 6. Here, loads acting on the central body 5 are conducted via the struts 31, 32 and the reinforced side structures 21a to the ring-shaped flange 6, via which said loads can be dissipated into housing components connected to the flange 6. Loads acting on the central body 5 are thus dissipated directly to the thrust nozzle wall and from the latter into housing structures, without loads acting on the central body 5 being transmitted to components of the core engine, as would be the case if, by contrast to the present invention, the central body 5 were fastened to an axially arranged nozzle needle.

Alternatively, the loads acting on the central body 5 may be dissipated via the struts and the thrust nozzle wall directly into the pylon, for which purpose the thrust nozzle is connected directly to the pylon by means of the ring-shaped flange 6 or in some other way (for example by means of defined fastening points).

FIGS. 4 and 5 show the thrust nozzle of FIG. 3 in two perspective views with opened thrust reverser doors, wherein, by contrast to FIG. 3, the outer wall 22 of the thrust nozzle 2 is also illustrated. The thrust reverser doors 81, 82 form movable structures of the thrust nozzle 2. Said thrust reverser doors are, as discussed with regard to FIG. 3, mounted on the reinforced side structures 21a. In the exemplary embodiment illustrated, said thrust reverser doors are formed in an upper and a lower region of the thrust nozzle 2, while the reinforced side structures 21a are formed in lateral regions. Alternatively, if sufficient space is available, provision may be made whereby the side structures 21a are formed in an upper and a lower region of the thrust nozzle 2, while the thrust reverser doors 81, 82 pivot open to the side.

The thrust reverser doors 81, 82 are, in the pivoted position, arranged such that their radially inner ends 810 are arranged at least partially downstream of the leading edge 311, 312 of the struts 31, 32 and at the same time lie against the struts 31, 32. In this way, it is achieved that the struts 31, 32 participate in the diversion of the gas in the flow channel, and the thrust reverser doors 81, 82 can be designed to be somewhat shorter.

Figure 6:
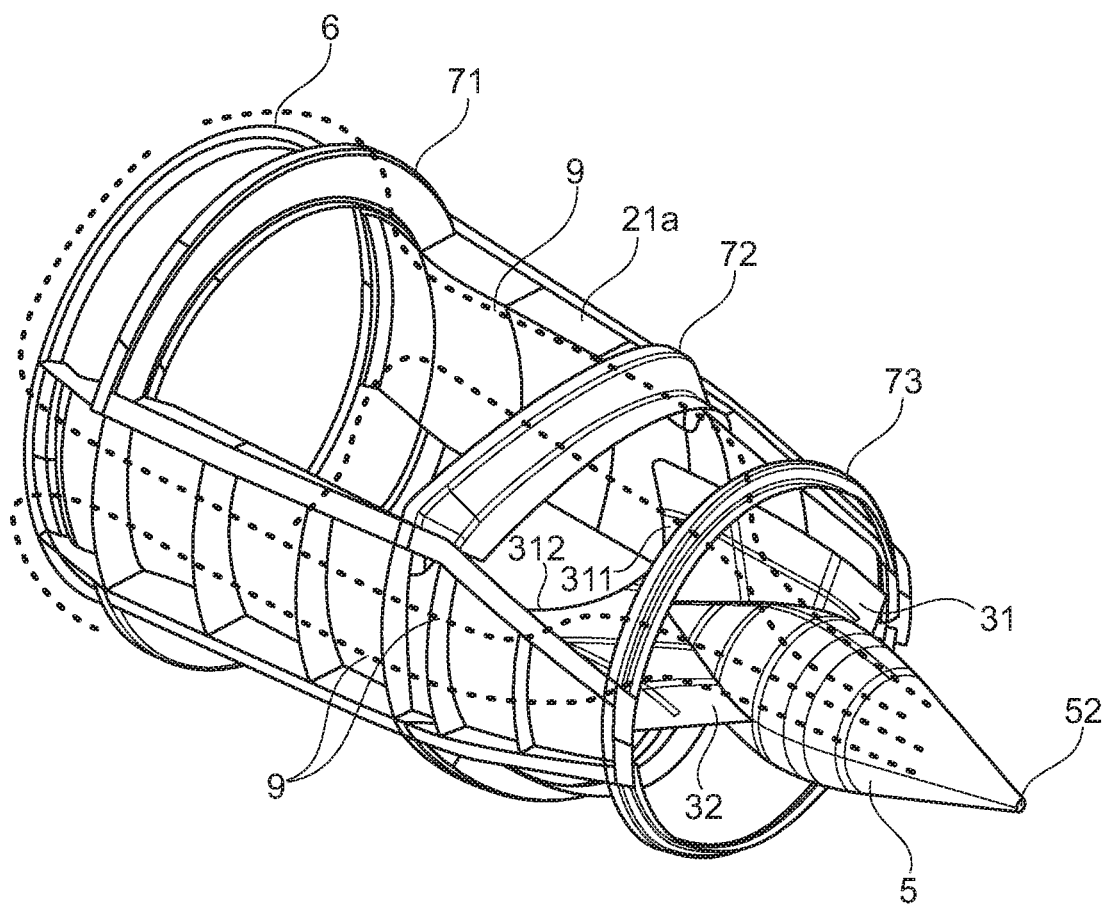
FIG. 6 shows the thrust nozzle of FIG. 3 in a perspective illustration obliquely from the rear, wherein force transmission paths via which loads are conducted from the central body to a ring-shaped flange of the thrust nozzle are additionally illustrated.

FIG. 6 corresponds to FIG. 3, wherein FIG. 6 shows the thrust nozzle of FIG. 3 in a view obliquely from the front. In addition to the illustration in FIG. 3, force transmission paths 9 are illustrated which show how loads acting on the central body 5 are transmitted via the struts 31, 32 and the reinforced side structures 21a along the shortest path to the flange 6 which serves as interface.

Figure 7:
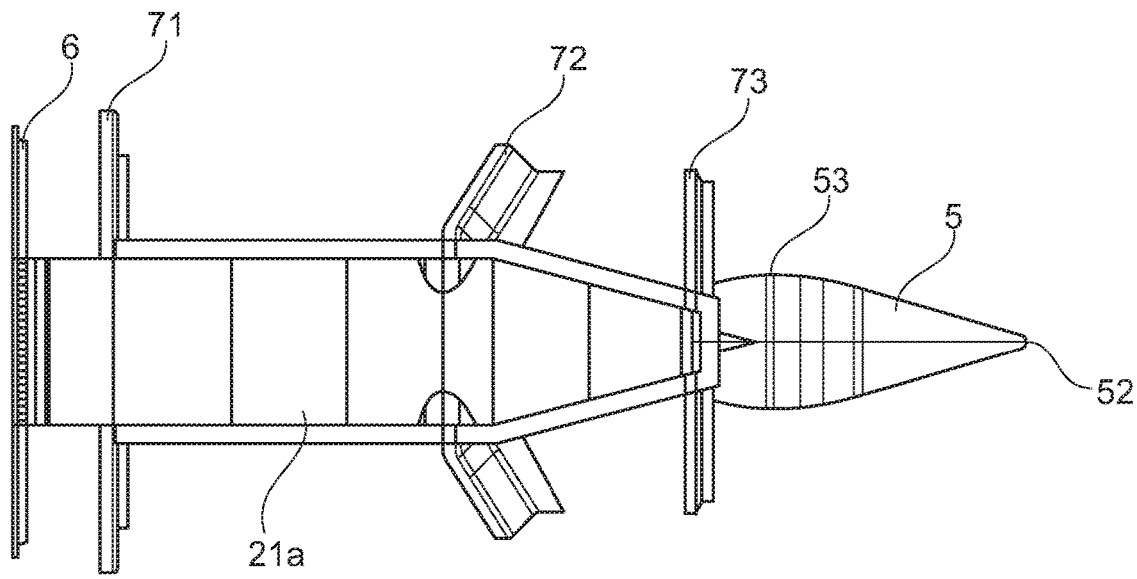
FIG. 7 shows the thrust nozzle of FIG. 3 in a lateral view.
Figure 8:
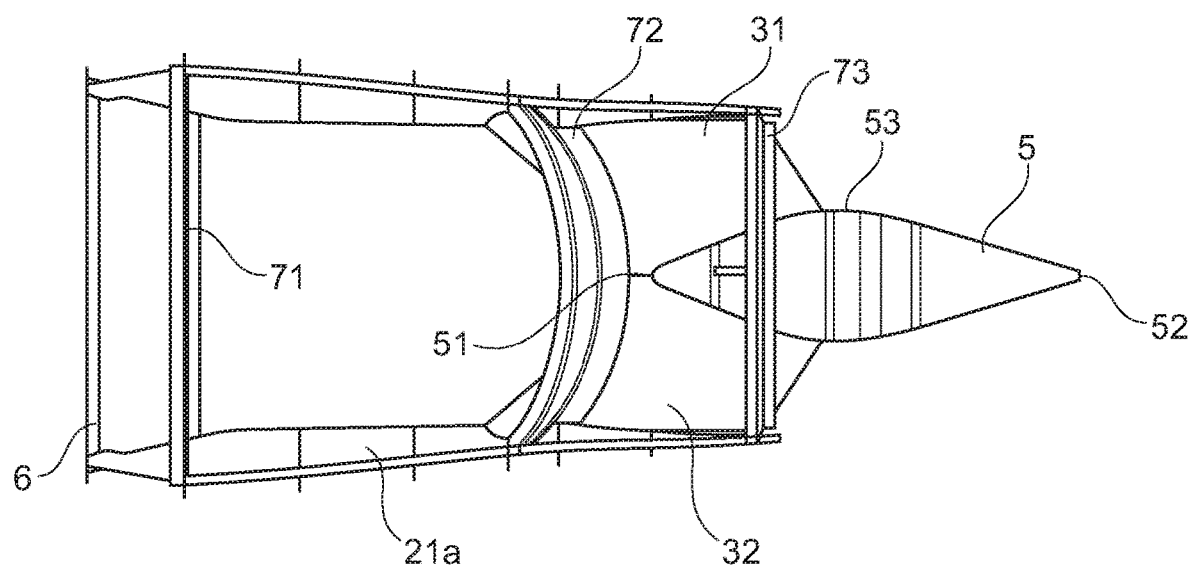
FIG. 8 shows the thrust nozzle of FIG. 3 in a view from above.

FIGS. 7 and 8 show the thrust nozzle 2 of FIG. 3 additionally in a side view and in a view from above. Here, FIG. 8 in particular illustrates the upstream end 51, the downstream end 52 and the maximum 53 of the cross-sectional area of the central body 5, which have been discussed with regard to FIG. 2.

FIG. 9 shows, in a sectional view which corresponds to the view in FIG. 2, an alternative exemplary embodiment of a thrust nozzle 2 which differs from the exemplary embodiment of FIG. 2 in that the struts 31, 32 are displaceable in an axial direction relative to the thrust nozzle wall 20, whereby axial displaceability of the central body 5 relative to the thrust nozzle wall 20 is provided. This permits a variation and setting of the nozzle throat area A8 and of the nozzle exit area A9 in a manner dependent on the axial position of the central body 5.

To realize displaceability of the struts 31, 32 relative to the thrust nozzle wall 20, in each case one mechanical interface 15 and at least one actuator 16 are provided. The actuators 16 are for example electric motors or hydraulic pistons. The mechanical interface 15 is formed for example by means of a rail guide. The adjusting force, or the torque that is to be transmitted for an adjustment, is transmitted by means of a linkage 17 connected by means of joints, or the like, from the actuator 16 to the interface 15 between the struts 31, 32 and the inner wall 21, where the transmitted force or the transmitted torque is converted into a translational movement.

FIG. 10 shows, in a sectional view which corresponds to the view of FIG. 2, a further alternative exemplary embodiment of a thrust nozzle 2. This differs from the exemplary embodiment of FIG. 2 in that, firstly, the central body 5 is displaceable in an axial direction relative to the struts 31, 32 and in that, secondly, the central body 5 has a greater axial length, wherein the upstream end 51 of said central body protrudes axially relative to the adjoining leading edge 311, 321 of the struts 21, 22.

To realize displaceability of the central body 5 relative to the struts 31, 32, in each case one mechanical interface 18 and at least one actuator 19 are provided. The actuators 19 are in turn for example electric motors or pneumatic pistons. The mechanical interface 18 is formed for example by means of a rail guide. The adjusting force, or the torque that is to be transmitted for an adjustment, is transmitted by means of a linkage 17 connected by means of joints, or the like, from the actuator 19 to the interface 18 between the central body 5 and the struts 31, 32, where the transmitted force or the transmitted torque is converted into a translational movement. Here, the linkage 17 is led through cavities or channels formed in the struts 31, 32 to the interface 18.

In the exemplary embodiment of FIG. 10, a maximum 53 of the cross-sectional area of the central body 5 is formed not merely at an axial point but rather over an axial region in which the central body 5 has the same cross-sectional area. The interface 18 is formed in this region.

In an alternative embodiment, the thrust nozzle is of two-dimensional design and accordingly has an inner wall which delimits the flow channel through the thrust nozzle radially to the outside, and which is of rectangular cross section. The central body is likewise of rectangular form in cross section. In such a case, the struts are for example arranged in each case centrally on opposite side walls of the central body of rectangular cross section, and connect the latter to the thrust nozzle wall.

The present invention is not restricted in terms of its configuration to the exemplary embodiments described above. For example, the number and shape of the struts that connect the central body to the thrust nozzle wall are to be understood merely as examples.

Furthermore, it is pointed out that the features of the individual described exemplary embodiments of the invention may be combined with one another in various combinations. If ranges are defined, said ranges thus comprise all of the values within said ranges as well as all of the partial ranges that lie in a range.

The invention claimed is:

1. A thrust nozzle for a turbofan engine of a supersonic aircraft, wherein the thrust nozzle comprises:
    a thrust nozzle wall,
    a flow channel which is delimited radially to an outside by the thrust nozzle wall,
    a central body arranged in the flow channel,
    two struts connecting the central body to the thrust nozzle wall,
    a thrust reverser integrated into the thrust nozzle, the thrust reverser including two pivotable thrust reverser doors which are rotatably mounted in two side structures of the thrust nozzle wall, the two side structures being formed on opposite sides of the thrust nozzle wall,
    the two struts being connected respectively to the two side structures of the thrust nozzle wall, and
    wherein the thrust reverser doors are, in a pivoted position, arranged such that radially inner ends thereof are arranged at least partially downstream of leading edges of the two struts and at the same time lie against the two struts.

2. The thrust nozzle as claimed in claim 1, wherein the two struts each have a profile with one of the leading edges and a trailing edge.

3. The thrust nozzle as claimed in claim 1, wherein the central body is connected via exactly two struts of the at least two struts to the thrust nozzle wall, wherein the exactly two struts are arranged in a same plane.

4. The thrust nozzle as claimed in claim 1, wherein the thrust nozzle includes an upstream coupling region configured for being connected to housing components of the core engine, wherein the two struts, the thrust nozzle wall and the upstream coupling region are arranged such that forces acting on the central body are conducted via the two struts and the thrust nozzle wall into the upstream coupling region.

5. The thrust nozzle as claimed in claim 1, wherein the two side structures are structurally reinforced to be structurally stronger than other regions of the thrust nozzle wall.

6. The thrust nozzle as claimed in claim 5, wherein the two side structures comprise ribbed stiffening elements which structurally reinforce the two side structures, and the two side structures are connected to one another at a top and a bottom by semicircular structural elements.

7. The thrust nozzle as claimed in claim 6, wherein the central body is fixed with respect to the thrust nozzle wall in an axial direction.

8. The thrust nozzle as claimed in claim 6, wherein the central body is axially displaceable with respect to the thrust nozzle wall.

9. The thrust nozzle as claimed in claim 8, wherein the central body is axially displaceable relative to the two struts.

10. The thrust nozzle as claimed in claim 8, wherein the two struts are axially displaceable relative to the thrust nozzle wall.

11. The thrust nozzle as claimed in claim 6, wherein the thrust nozzle wall is configured to be non-adjustable with regard to a nozzle throat area thereof and a nozzle exit area thereof.

12. The thrust nozzle as claimed in claim 6, wherein an upstream end of the central body is arranged downstream of the leading edges of the two struts, wherein the two struts adjoin one another at the radially inner ends.

13. The thrust nozzle as claimed in claim 12, wherein the leading edges of the two struts collectively form an arcuate curve which extends furthest upstream at radially outer ends of the two struts adjoining the thrust nozzle wall and extends furthest downstream at a centerline of the thrust nozzle.

14. The thrust nozzle as claimed in claim 6, wherein an upstream end of the central body is arranged at the leading edge of at least one of the two struts or upstream of the leading edge of at least one of the two struts.

15. The thrust nozzle as claimed in claim 6, wherein the central body is of conical shape at an upstream end thereof and/or at a downstream end thereof and forms at least one maximum of a cross-sectional area thereof between the upstream end and the downstream end.

16. The thrust nozzle as claimed in claim 6, wherein the central body is rotationally symmetrical.

17. The thrust nozzle as claimed in claim 6, wherein at least the leading edges of the two struts are positioned axially upstream of a nozzle throat of the thrust nozzle.

18. The thrust nozzle as claimed in claim 6, wherein the thrust nozzle is formed as a convergent-divergent thrust nozzle or as a convergent-cylindrical thrust nozzle.

19. The thrust nozzle as claimed in claim 6, wherein the central body is connected to the thrust nozzle, and mounted therein, exclusively via the two struts, and no further structural components are present which absorb forces acting on the central body.

20. A thrust nozzle for a turbofan engine of a supersonic aircraft, wherein the thrust nozzle comprises:
    a thrust nozzle wall,
    a flow channel which is delimited radially to an outside by the thrust nozzle wall,
    a central body arranged in the flow channel,
    at least two struts connecting the central body to the thrust nozzle wall,
    a thrust reverser integrated into the thrust nozzle, the thrust reverser including two pivotable thrust reverser doors which are rotatably mounted in two side structures of the thrust nozzle wall, the two side structures being formed on opposite sides of the thrust nozzle wall,
    the at least two struts being connected respectively to the two side structures of the thrust nozzle wall,
    wherein the central body is axially displaceable with respect to the thrust nozzle wall, and
    wherein the at least two struts are axially displaceable relative to the thrust nozzle wall.

* * * * *